United States Patent [19]

Moriya et al.

[11] 3,846,916

[45] Nov. 12, 1974

[54] MEASURING SYSTEM FOR ROUNDNESS OF WORKPIECE

[75] Inventors: Kazuo Moriya, Kariya; Isao Suzuki, Okazaki, both of Japan

[73] Assignee: Toyoda-Koki Kabushiki Kaisha, Kariya-shi, Aichi-ken, Japan

[22] Filed: May 11, 1973

[21] Appl. No.: 359,420

[30] Foreign Application Priority Data
May 16, 1972 Japan.............................. 47-48717

[52] U.S. Cl. ............................ 33/174 Q, 33/178 E
[51] Int. Cl....... G01b 7/28, G01b 7/34, G01b 19/26
[58] Field of Search .......... 33/174 L, 174 Q, 178 E, 33/172 E, 147 N, 143 L

[56] References Cited
UNITED STATES PATENTS

| 3,615,143 | 10/1971 | Barr et al. ......................... 33/174 L |
| 3,717,934 | 2/1973 | Ishikawa............................. 33/174 L |
| 3,768,010 | 10/1973 | Pozzetti ............................. 33/174 Q |

Primary Examiner—Harry N. Haroian
Assistant Examiner—Willis Little
Attorney, Agent, or Firm—Berman, Bishoff & Platt

[57] ABSTRACT

A sizing device provided with measuring feelers, to respond to the changes of diameter of a workpiece, and a displacement detector to generate an output signal in response to the relative displacement of the feelers. The output signal is converted to a voltage signal, which includes a direct-current portion according to the decrease of diameter of the workpiece and an alternating-current portion according to the deviation of roundness of the workpiece. A filter circuit cuts out only the direct-current portion. A voltage comparator compares the alternating-current portion with a preset reference voltage, corresponding to an allowable deviation of roundness, to thereby generate a series of pulses until the voltage signal drops to the value of the reference voltage. A detecting device detects the decay of charging voltage of the pulses to a predetermined limit after the disappearance of the pulses to thereby generate a signal of roundness indicative that the roundness of the workpiece is within the predetermined limit.

6 Claims, 8 Drawing Figures

MEASURING SYSTEM FOR ROUNDNESS OF WORKPIECE

BACKGROUND OF THE INVENTION

The present invention relates to measuring systems, and more particularly to a measuring system for measuring the roundness of a workpiece.

Conventional measurements or inspections of roundness are performed on a workpiece, by removing the workpiece from the machine tool and placing the workpiece in another measuring machine, or the like, provided with a polar recorder by which the radial displacement caused by the deviation of roundness of the workpiece is traced by means of an electrical or a mechanical magnifier. Although high accuracy of roundness is required in recent machining operations in addition to accuracy of size, conventional measuring systems are not capable of measuring the roundness of a workpiece to thereby control the feed of an operative tool during the time a machining operation is being performed on the workpiece.

SUMMARY OF THE INVENTION

It is, therefore, an object of the present invention to provide an improved measuring system capable of measuring the roundness of a workpiece during a machining operation.

It is another object of the present invention to provide an improved measuring system which, during the time a machining operation is being performed on a workpiece, generates a signal indicating that the workpiece has attained an allowable roundness.

Still another object of the present invention is to provide an improved roundness-measuring system having electrical circuits wherein a voltage signal according to the deviation of roundness of a workpiece is detected and compared with a pre-set reference voltage corresponding to an allowable roundness.

According to the present invention these and other objects are achieved by providing a measuring system as described hereinafter.

A feeler means is adapted to be held in abutting engagement with a workpiece so as to respond to the changes of diameter of the workpiece. A displacement detector is connected to the feeler means for generating an output signal in response to the displacement of the feeler means. A circuit converts the output signal to a voltage signal which includes a direct-current portion corresponding to the decrease of diameter of the workpiece and an alternating-current portion corresponding to the deviation of roundness of the workpiece. A filter circuit cuts out the direct-current portion. A voltage comparator compares the alternating-current portion with a pre-set reference voltage corresponding to an allowable roundness to thereby generate a series of pulses until the voltage of the alternating-current portion reaches the reference voltage. A detecting device detects the decay of charging voltage of the pulses to a predetermined limit to thereby generate a signal of roundness indicative that the roundness of the workpiece is within the predetermined limit.

BRIEF DESCRIPTION OF THE DRAWINGS

The foregoing and other objects of the present invention will become fully apparent from the following description of a preferred embodiment of the present invention with reference to the accompanying drawings, in which.

DETAILED DESCRIPTION OF THE PREFERRED INVENTION

Figure 1:
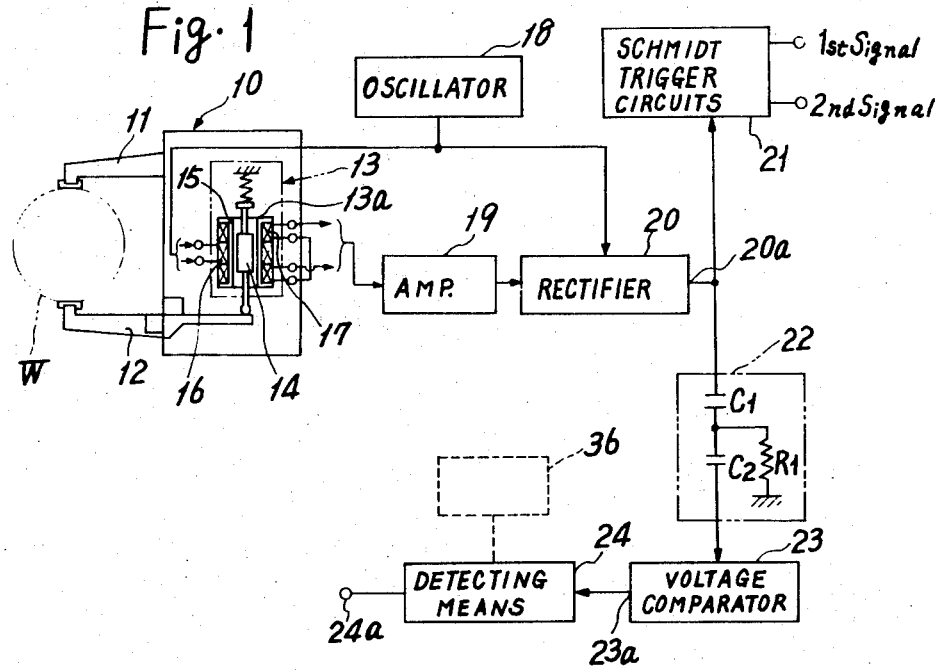
FIG. 1 is a schematic block diagram showing a measuring system for the roundness of a workpiece according to the present invention.

Referring now to the drawings, wherein like reference numerals designate identical, or corresponding parts throughout the several views, and more particularly to FIG. 1 thereof, wherein a sizing device 10 to be mounted on a work table (not shown) of a grinding machine, or the like, comprises a pair of measuring feelers 11 and 12 and a displacement detector 13 such as a differential transformer 13a. The pair of measuring feelers 11 and 12 are adapted to be accurately held in abutting engagement with diametrically opposed portions of a workpiece W during a grinding operation so as to respond to the changes of diameter of the workpiece, as is well-known to those skilled in the art. The differential transformer 13a includes a bobbin 15, primary and secondary coils 16 and 17 respectively, differentially wound with respect to each other on a peripheral groove of the bobbin 15, and a core 14 movably disposed within the bobbin 15 in a concentric relationship with the primary and secondary coils 16 and 17. The core 14 is operably connected to the lower measuring feeler 12 so as to respond to the changes of diameter of the workpiece W.

A detailed description of the differential transformer 13a will not be given since the same is well-known to those skilled in the art and is, therefore, unnecessary. When the primary coil 16 is energized by a suitable oscillator 18 which generates alternating-current of high frequency, an output voltage will appear at the output terminals of secondary coil 17 in accordance with the amount of displacement of the core 14 relative to the bobbin 15. The output voltage is applied for amplification to a conventional amplifier 19. The amplified output is then applied to a synchronous rectifier 20 wherein the output is synchronously converted to a linear wave form, as is well-known.

Figure 2:
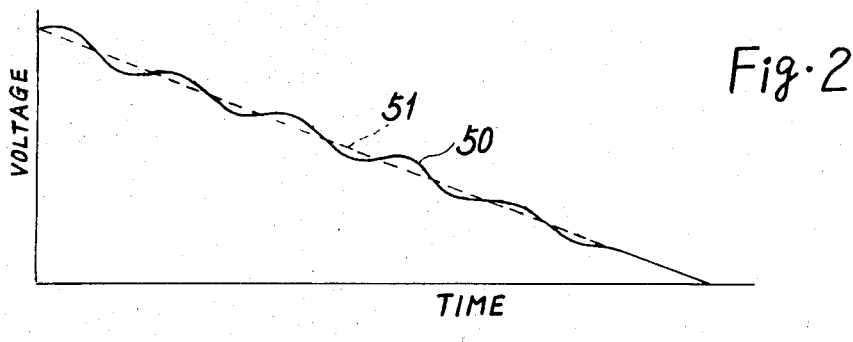
FIG. 2 is a graph showing the output wave form of the synchronous rectifier used in the measuring system.

As shown by dotted line 51 of FIG. 2, the rectified direct-current voltage linearly decreases with constant slope in proportion to the decrease of diameter of the workpiece when the workpiece is being ground in the state of no deviation of roundness. However, in the actual grinding operation an output voltage having a wave form as shown by whole line 50 of FIG. 2 is generated since the workpiece during grinding is not in the state of no deviation of roundness. Therefore, measurement of the roundness of the workpiece can be favorably performed by eliminating the direct-current voltage portion of the rectified direct-current voltage and by using only the alternating-current voltage portion thereof corresponding to the deviation of roundness of the workpiece.

Figure 5:
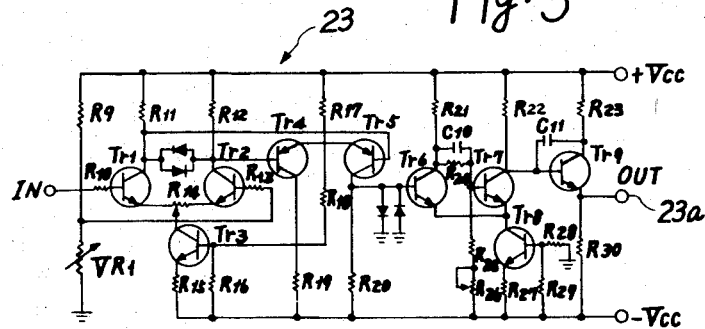
FIG. 5 is a circuit diagram of a voltage comparator used in the system of FIG. 1 to compare the rectangular output wave of FIG. 4 with a predetermined voltage corresponding to an allowable tolerance of roundness.
Figure 3:
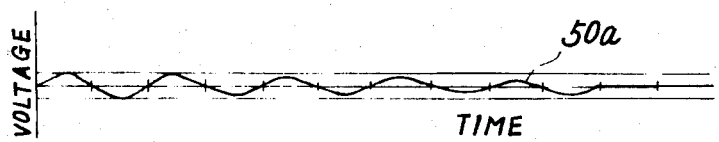
FIG. 3 is a graph showing the output wave form of the filter circuit used in the measuring system of FIG. 1.

The output terminal 20a of rectifier 20 is connected to a filter circuit 22 which comprises condensers C1 and C2 and a resistor R1 connected at one side to ground and at the other side to the condensers C1 and C2. The value of the resistor R1 is predetermined so that the filter circuit 22 may have a time constant to cut only the direct-current voltage portion of the rectified output. Thus, the alternating-current voltage portion of wave form 50a appears at the output terminal of the filter circuit 22, corresponding to the deviation of roundness of the workpiece W which is being ground, as shown in FIG. 3. The alternating-output 50a is then applied to a voltage comparator 23, which is sensitively operable even in the vicinity of zero voltage level, to be compared with a reference voltage pre-set in the same. For example, when the operational point is pre-set to zero volts, the voltage comparator 23 conducts the positive portion of the alternating-current wave form 50a and does not conduct the negative portion of the wave form 50a, thus generating a rectangular pulse output 50b, FIG. 4. In the present embodiment, the voltage comparator 23 compares the alternating-current portion 50a with the reference voltage pre-set thereto corresponding to a predetermined allowable deviation of roundness. Therefore, an electric pulse 50b appears at the output terminal 23a of the voltage comparator 23 each time the voltage of the alternating-current portion 50a exceeds the pre-set reference voltage. When the workpiece W has been ground in section to the allowable deviation of roundness, electric pulse 50b disappears, since the voltage of alternating-current 50a is less than the pre-set reference voltage. A detailed description of the voltage comparator 23 will not be given, though the circuit is shown in FIG. 5, since such voltage comparator is well-known to those skilled in the art. One such voltage comparator is manufactured by TELEDYNE PHILBRICK, Allied Drive at Route 128, Dedham, Mass., 02026, U.S.A., being commercially available as TYPE 741 BE.

Figure 6:
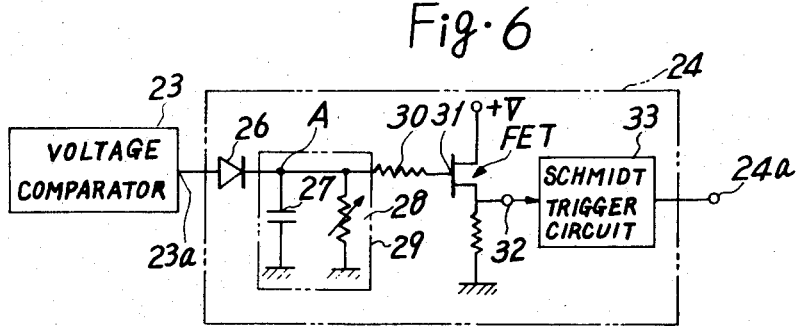
FIG. 6 is a circuit diagram showing an embodiment of a detecting circuit usable in the system of FIG. 1 to detect the disappearance of the rectangular output wave of FIG. 4.
Figure 7:
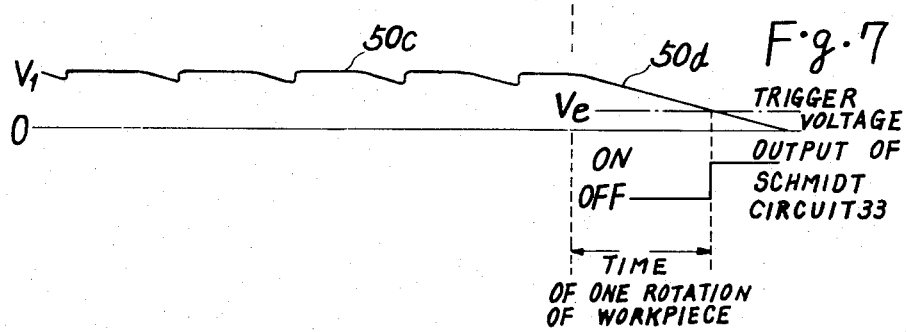
FIG. 7 is a schematic graph showing the signal wave forms of the detecting circuit of FIG. 6.

A detecting circuit 24, as shown in FIG. 6, is connected to the voltage comparator 23 for detecting the disappearance of rectangular output pulse 50b. A charging circuit 29 is connected to the output terminal 23a through a diode 26. The charging circuit 29 comprises a condenser 27 and a variable resistor 28 which are connected to and between the diode 26 and ground. A field-effect transistor FET is connected to the charging circuit 29 through a resistor 30 at its gate terminal so that the charging voltage of condenser 27 may be applied to the gate terminal of the transistor. Since the input impedance of the field-effect transistor FET is extremely large, the charging voltage of the condenser 27 is substantially discharged through the variable resistor 28. Thus, any time constant can be selected by adjusting the value of resistance of the variable resistor 28 to thereby set any drop rate of discharge voltage of the consenser 27. The output terminal 32 of the field-effect transistor FET is connected to a Schmidt trigger circuit 33 to apply the charging voltage of the condenser 27 to the same. The operation point or trigger voltage Ve, FIG. 7, of the Schmidt trigger circuit 33 is pre-set less than the voltage V1 of charging wave form 50c, FIG. 7, when electric pulses 50b are being applied to the charging circuit 29. With relation to trigger voltage Ve, furthermore, the time constant, or the discharge curve 50d, of the charging circuit 29 is predetermined by the variable resistance so that the charging voltage of condenser 27 may become less than the trigger voltage Ve approximately in the time span corresponding to one rotation of the workpiece W after the electric pulses 50b disappear. Thus, when the discharge voltage 50d of the charging circuit 29 drops to the trigger voltage Ve, which may be pre-set thereto in relation to the drop rate of the discharge voltage so as to detect the one rotation of the workpiece, a signal of roundness indicating that the workpiece W is formed in section to the allowable deviation of roundness appears at the output terminal 24a of detecting circuit 24, and which signal is used to move the grinding wheel back to its start position as will be more fully explained below.

Figure 4:
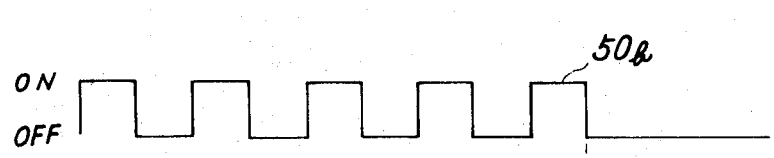
FIG. 4 is a graph showing a rectangular wave form corresponding to the output wave form of FIG. 3 and obtained by modifying said output wave form in a voltage comparator.
Figure 8:
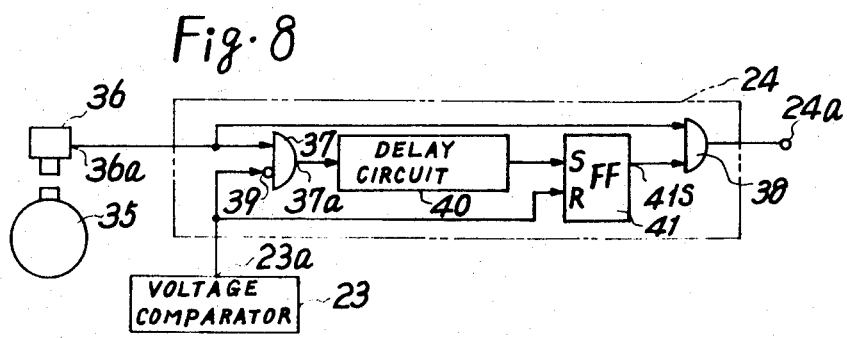
FIG. 8 is a schematic circuit diagram showing another embodiment of a detecting circuit usable in the system of FIG. 1.

FIG. 8 shows another embodiment of the detecting circuit 24. A rotation detecting device 36 is provided to generate a pulse signal each time the work spindle 35 rotates once. The pulse signal is applied to one of the input terminals of AND gates 37 and 38. The other input terminal is connected to the output terminal 23a of voltage comparator 23 through a NOT circuit 39. The output terminal 37a of AND gate 37 is connected to the set terminal S of an S-R, or set-reset type, flip-flop 41 through a time delay circuit 40 which delays the pulse signal a little longer in time than the width of its one pulse. The input or reset terminal R of the flip-flop 41 is connected to the output terminal 23a. The flip-flop 41 is reset each time the rectangular pulse 650b, FIG. 4, is applied to the reset terminal R thereof. The output terminal of set of the flip-flop 41 is connected to the output terminal 41s of an AND gate 38. Thus, the detecting circuit 24 is constructed. The flip-flop 41 is set when the output of voltage comparator 23 is in the 0 state and the output of rotation detecting device 36 is in the 1 state. However, since the setting input is delayed by the time delay circuit 40, the AND gate 38 is not opened. The flip-flop 41 is reset when the output of voltage comparator 23 is turned on state 1. In this state, therefore, the AND gate 38 is not opened even when the output of rotation detecting device 36 is in state 1. The AND gate 38 is opened when the pulse signal is generated by the rotation detecting device 36 under the 1 state of flip-flop 41 caused by the disappearance of rectangular output 50b, thus generating the signal of roundness at the output terminal 24a thereof.

Numeral 21, FIG. 1, designates another voltage comparator which compares the rectified output 50 with pre-set reference voltages so as to generate sizing signals when the workpiece is ground to predetermined sizes. The voltage comparator 21 includes two Schmidt trigger circuits wherein two trigger voltages corresponding to predetermined sizes of work diameter are pre-set so that first and second sizing signals, which instruct the change of feed rate of a wheel slide to a relay circuit, may be generated in order as the grinding operation progresses. Detailed descriptions of the wheel slide, the relay circuit and the hydraulic control circuit associated therewith will not be given since the same are well-known to those skilled in the art, but reference is made to FIGS. 7 and 8 of U.S. Pat. No. 3,622,287, Kurimoto, et al., assignor to Toyoda Koki Kabushiki Kaisha.

The grinding wheel is rapidly moved to a position reached just before contacting the workpiece, and then is advanced to contact the workpiece at a reduced speed for rough grinding. As the rough grinding operation progresses, the workpiece is reduced in diameter to a value slightly greater than the finish dimension and the rectified voltage 50 approaches the predetermined trigger voltage level. When the grinding operation has progressed to a point where only finish depth of cut is left to be made on the workpiece, the first sizing signal is generated by the action of the Schmidt circuit which causes the hydraulic control circuit to change from the first reduced speed for rough grinding to the further reduced speed for fine grinding. Further progress in the grinding operations eventually results in the generation of the second sizing signal to stop the feed movement of the wheel slide. Then, the spark-out operation is performed on the workpiece for a predetermined time. When the signal of roundness is generated during the spark-out operation, the signal instructs and causes the wheel slide to move rearwardly at rapid speed to the starting position thereof.

As explained above, according to the present invention, the roundness of a workpiece can be easily measured by a combination of a conventional in-process gauge and a simple electric circuit even during a grinding operation. When the feed of the grinding wheel is controlled by the signal of roundness, it is advantageous that the workpiece can be ground within an allowable tolerance not only as to accuracy of size, but also as to geometrical accuracy, as for example, roundness.

Although certain specific embodiments of the invention have been shown and described, it is obvious that many modifications thereof are possible. The invention, therefore, is not intended to be restricted to the exact showing of the drawings and description thereof, but is considered to include reasonable and obvious equivalents.

We claim:

1. A system, for measuring the roundness of a workpiece during working, comprising; a feeler means adapted to be held in abutting engagment with a workpiece so as to respond to changes of diameter of the workpiece, a displacement detector connected to said feeler means for generating an output signal in response to the displacement of said feeler means, circuit means for converting said output signal to a voltage signal including a direct current portion corresponding to the decrease of a diameter of the workpiece and an alternating current portion corresponding to the deviation of roundness of the workpiece, filter circuit means for eliminating said direct current portion of the voltage signal, a voltage comparator having a pre-set reference voltage corresponding to an allowable roundness connected to said filter circuit means for comparing said alternating current portion of the voltage signal with said pre-set reference voltage and thereby generating a series of pulses until the voltage of said alternating current portion of said voltage signal drops to the value of said reference voltage, and detecting means connected to said voltage comparator for detecting the decay of charging voltage of said pulses to a predetermined limit to thereby generate a signal of roundness indicative that the roundness of the workpiece is within said predetermined limit.

2. A measuring system according to claim 1, wherein said converting circuit means comprises an amplifier connected to said displacement detector and a rectifier connected to said amplifier for synchronously rectifying said output signal.

3. A measuring system according to claim 1, wherein said detecting means for generating said signal of roundness comprises a diode connected to said voltage comparator, a charger connected to said diode to be charged with the voltage of each of said pulses and discharging the voltage of each of said pulses at a drop rate, a field-effect transistor having its base terminal connected to said charger, and a trigger circuit means having a pre-set trigger voltage connected to said field-effect transistor for generating said signal of roundness when the discharge voltage of said charger drops to said trigger voltage, said trigger voltage being predetermined in accordance with said predetermined limit.

4. A measuring system according to claim 1, wherein said detecting means for generating said signal of roundness comprises, a first AND gate, a NOT circuit for connecting one input terminal of said first AND gate to said voltage comparator, a rotation detecting device connected to another input terminal of said AND gate, a time delay circuit connected to the output terminal of said first AND gate, a flip-flop having a set terminal connected to the output terminal of said time delay circuit, and a re-set terminal connected to said voltage comparator, and a second AND gate having input terminals connected to the output terminal of said flip-flop and to said rotation detecting device and an output terminal for yielding the generated signal indicative of roundness.

5. A measuring system according to claim 1, further comprising a comparator means having a pre-set reference voltage corresponding to a predetermined diameter of the workpiece, said comparator means being connected to said converting circuit means for generating a sizing signal when said voltage signal drops to equal said reference voltage pre-set in the comparator means.

6. A measuring system according to claim 5, wherein said comparator means includes a plurality of Schmidt Trigger circuits for generating a plurality of said sizing signals corresponding to different desired diameters of the workpiece.

* * * * *